United States Patent
Narita et al.

(10) Patent No.: US 11,235,285 B2
(45) Date of Patent: Feb. 1, 2022

(54) FILM SEPARATION DEVICE, STRUCTURE FOR ARRANGING FILM ELEMENT, AND FILM CASSETTE AND FILM UNIT

(71) Applicant: MEIDENSHA CORPORATION, Tokyo (JP)

(72) Inventors: Taichi Narita, Kawagoe (JP); Shigeo Ishimoto, Koshigaya (JP)

(73) Assignee: MEIDENSHA CORPORATION, Tokyo (JP)

(*) Notice: Subject to any disclaimer, the term of this patent is extended or adjusted under 35 U.S.C. 154(b) by 56 days.

(21) Appl. No.: 16/885,530

(22) Filed: May 28, 2020

(65) Prior Publication Data

US 2020/0360863 A1    Nov. 19, 2020

Related U.S. Application Data

(62) Division of application No. 16/304,868, filed as application No. PCT/JP2017/016959 on Apr. 28, 2017, now Pat. No. 10,940,440.

(30) Foreign Application Priority Data

May 31, 2016 (JP) .................. 2016-108645
Sep. 21, 2016 (JP) .................. 2016-183565

(51) Int. Cl.
  *B01D 63/08* (2006.01)
  *C02F 1/44* (2006.01)

(52) U.S. Cl.
  CPC ............ *B01D 63/082* (2013.01); *C02F 1/44* (2013.01); *B01D 2313/06* (2013.01); *B01D 2313/44* (2013.01)

(58) Field of Classification Search
  CPC ............ B01D 63/082; B01D 2313/06; B01D 2313/44; B01D 2313/21; B01D 2313/025;
  (Continued)

(56) References Cited

U.S. PATENT DOCUMENTS 9,878,290 B2    1/2018  Matsuzaki et al.
10,106,440 B2   10/2018 Masutani et al.
(Continued)

FOREIGN PATENT DOCUMENTS

CN    103269779 A    8/2013
CN    104981432 A    10/2015
(Continued)

OTHER PUBLICATIONS

USPTO Office Action, U.S. Appl. No. 16/304,868, dated Jun. 8, 2020, 10 pages.
(Continued)

*Primary Examiner* — Madeline Gonzalez

(74) *Attorney, Agent, or Firm* — Foley & Lardner LLP

(57) ABSTRACT

There is provided a film separation device 1 equipped with a treatment tank 2 receiving a liquid to be treated, a film unit 3 to be immersed in the liquid to be treated, and a guide mechanism 4. The guide mechanism 4 is composed of holding sections 14 and a guide section 15. The holding sections 14 are provided on a side section of a film cassette 5 constituting the film unit 3, and the guide section 15 is fixed to the treatment tank 2. The guide section 15 has a tank-wall fixed section 15a, an upper extension section 15b, a held section 15c, a lower extension section 15d, and a tank-bottom fixed section 15e. When fixing the film unit 3 to the treatment tank 2, the holding sections 14 are fitted to the held section 15c, thereby guiding the film unit 3 to a predetermined position in the treatment tank 2.

9 Claims, 14 Drawing Sheets

(58) Field of Classification Search
CPC ....... B01D 2315/06; B01D 63/08; C02F 1/44;
C02F 3/1268; Y02W 10/10
USPC ....... 210/224, 227, 228, 231, 236, 252, 253,
210/261, 262, 314, 330, 331, 321.84
See application file for complete search history.

(56) References Cited

U.S. PATENT DOCUMENTS

| | | |
|---|---|---|
| 2009/0236295 A1 | 9/2009 | Braun et al. |
| 2013/0299413 A1* | 11/2013 | Masutani ............. B01D 63/082 |
| | | 210/321.84 |
| 2016/0016762 A1 | 1/2016 | Okajima et al. |
| 2019/0119077 A1 | 4/2019 | Okajima et al. |

FOREIGN PATENT DOCUMENTS

| | | |
|---|---|---|
| JP | 06-218248 A | 8/1994 |
| JP | 11-319511 A | 11/1999 |
| JP | 2008-246371 A | 10/2008 |
| JP | 2009-148743 A | 7/2009 |
| JP | 2011-255305 A | 12/2011 |
| JP | 2012-148229 A | 8/2012 |
| JP | 2014-046275 A | 3/2014 |
| JP | 2014-076417 A | 5/2014 |
| WO | WO-2014/157487 A1 | 10/2014 |

OTHER PUBLICATIONS

Chinese Office Action and English translation, dated May 21, 2019, 19 pages.

* cited by examiner

FIG. 10A
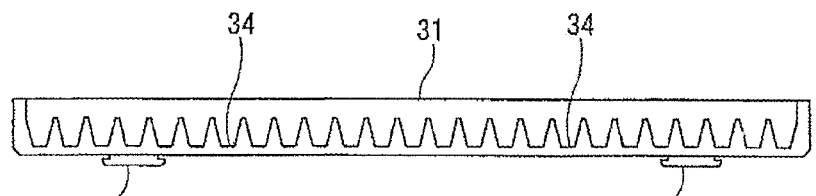
FIG. 10B
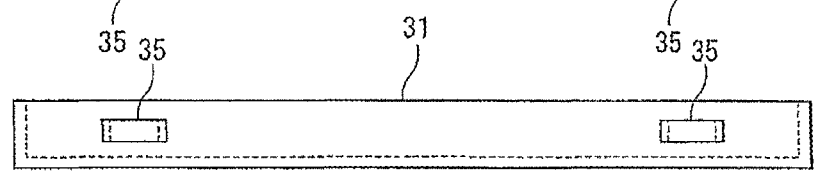
FIG. 10C
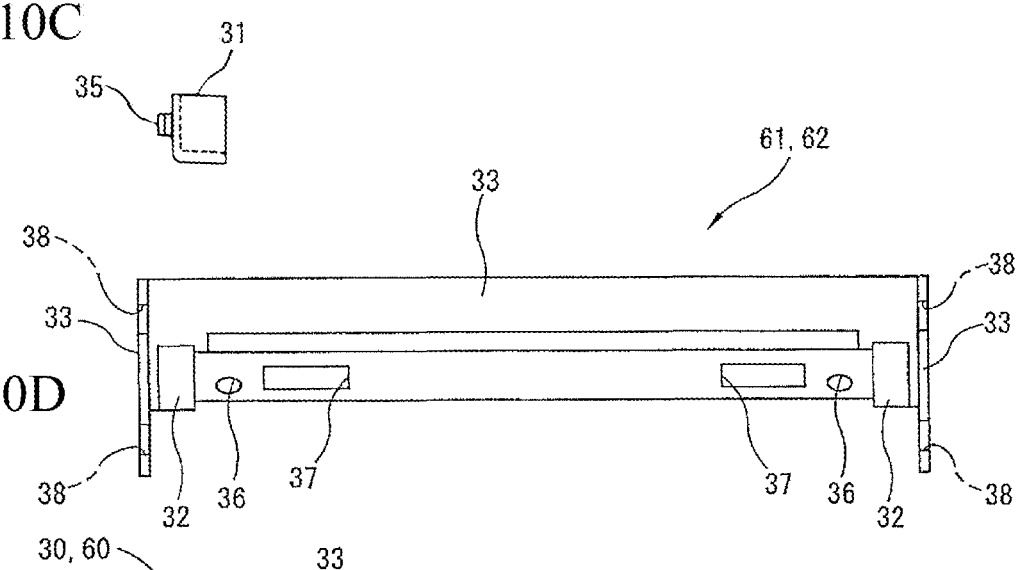
FIG. 10D
FIG. 10E
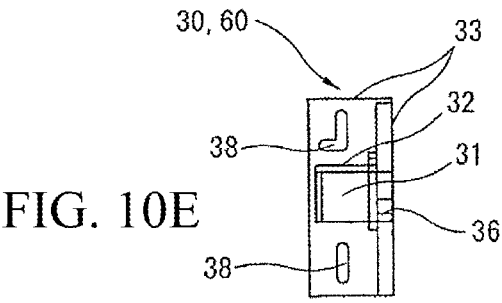

FIG. 12A
FIG. 12B
FIG. 12C
FIG. 12D
FIG. 12E
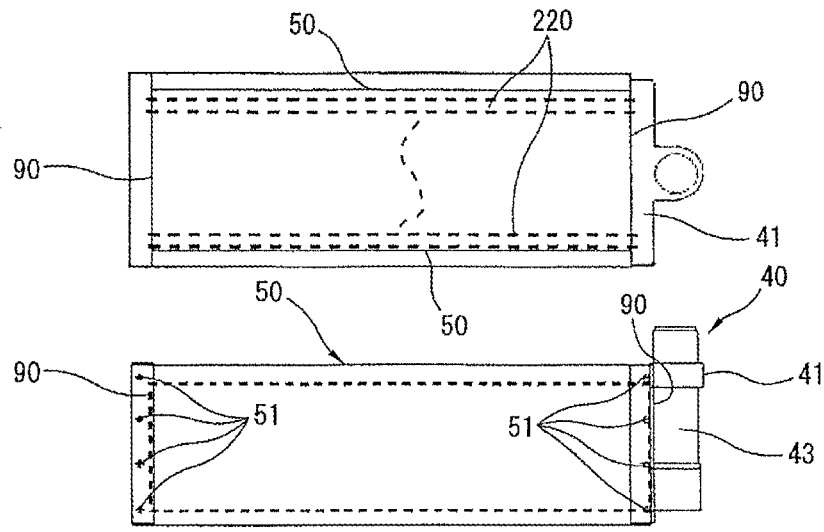
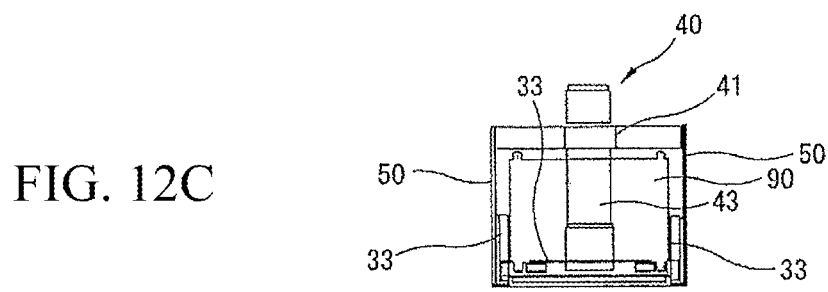
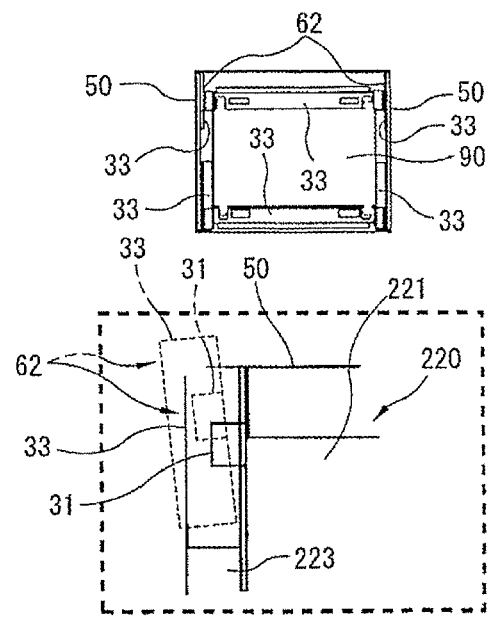

FILM SEPARATION DEVICE, STRUCTURE FOR ARRANGING FILM ELEMENT, AND FILM CASSETTE AND FILM UNIT

CROSS REFERENCE TO RELATED APPLICATIONS

This application is a divisional application of U.S. application Ser. No. 16/304,868, filed on Nov. 27, 2018, which is the National Stage of Application No. PCT/JP2017/016959 filed on Apr. 28, 2017, which is based upon and claims the benefit of priority from Japanese Application Nos. 2016-183565, filed on Sep. 21, 2016 and 2016-108645, filed on May 31, 2016, the entire contents of all of which are incorporated herein by reference.

TECHNICAL FIELD

The present invention relates to a film separation device. In particular, it relates to a film separation device having a guide mechanism for assisting rise and fall of a film unit. Furthermore, it relates to a film cassette equipped with flat plate film elements and a film unit having the film cassette.

BACKGROUND ART

Hitherto, there has been applied a film separation device as a solid-liquid separation means in sewage treatment or industrial waste water treatment. The film separation device is a device that is immersed in a biological treatment tank or a coagulation treatment tank to conduct a biological treatment or a coagulation treatment on pollutants contained in waste water and then conduct a solid-liquid separation into solid substance and aqueous component. In the film separation device, sludge accumulates on the separation film surface as the operation time passes. Therefore, aeration air is supplied to a liquid to be treated, thereby generating an air-lift upward flow, and this upward flow adds shear force to the separation film surface to remove sludge on the film surface. Furthermore, in case that sludge accumulation on the separation film surface is considerable, it is necessary to pull up a film unit equipped with the separation film from the treatment tank to wash the separation film.

However, a liquid to be treated staying in the treatment tank is opaque due to suspension of microorganisms and suspended matters, etc. Therefore, it is difficult to conduct visual observation and check of the position of the film separation device immersed, from above the tank. Furthermore, it has been difficult to take the film unit into or out of the treatment tank due to the constant necessity of guiding the film unit's posture and/or position when immersing the film unit.

Thus, in conventional film separation devices, a guide mechanism for assisting rise and fall is provided, thereby making it easy to take the film unit thereinto and out thereof (e.g., Patent Publications 1 and 2).

For example, as shown in FIGS. 16A and 16B, in a film separation device 22 described in Patent Publication 1, a plurality of fixing members (rise and fall guide) 23 are installed in a treatment tank 24, and the film unit 25 is made to fall between the fixing members 23 to achieve a constant posture of the film unit 25. Furthermore, the film unit 25 is provided with a room section (not shown in the drawings), and this room section is filled with air to stably conduct rising up of the film unit 25.

Furthermore, as shown in FIGS. 17A and 17B, in a film separation device 26 described in Patent Publication 2, multilevel guide units 28 are arranged on inner wall sides of a treatment tank 27. Of these, at least one guide unit 28 is arranged at a height that is above the water level of the liquid to be treated. In this film separation device 26, the guide units 28 are installed on the wall surfaces. Therefore, it is possible to easily determine the installation position of the film unit 29. Furthermore, when taking the film unit 29 thereinto or out thereof, it is possible to easily confirm the installation position of the film unit 29 by the guide units 28 arranged at a height above the water surface.

Furthermore, as a film separation device, for example, there is known a film cassette disclosed in Patent Publication 3. In this film cassette, a plurality of flat plate film elements are arranged in a frame at predetermined intervals. In particular, this film element is put into a guide groove of the frame in a manner that it can be withdrawn from the frame.

However, in the film cassette of Patent Publication 3, each film element is connected to a water collecting pipe of the film cassette by a connector through a flexible tube. Therefore, when attaching and detaching the film element in its maintenance, it is necessary to have a long time in the attaching and detaching operations of the flexible tube and the connector. In particular, depending on the installation scale of the film cassettes, the number of the film elements to be installed becomes several thousands to tens of thousands. Therefore, a considerable labor is necessary for its maintenance and management. Furthermore, a careful handling is necessary so as to avoid damage or breakage of the filter body during the attachment or detachment operation of the film elements.

Thus, as a film cassette that does not require a flexible tube for connecting the film cassette and the water collecting pipe, there is known a film cassette disclosed in Patent Publication 4. A film element of this film cassette is composed of a flat plate ceramic filter and water collecting sections installed on both end sections of this ceramic filter. Water collecting tube sections and the water collecting sections of this film element are engaged in racks. With this, a plurality of the film elements are supported in the racks.

PRIOR ART PUBLICATIONS

Patent Publications

Patent Publication 1: JP Patent Application Publication Heisei 11-319511.

Patent Publication 2: JP Patent Application Publication 2014-46275.

Patent Publication 3: JP Patent Application Publication 2009-148743.

Patent Publication 4: Specification of US Patent Application Publication 2009/0236295.

SUMMARY OF THE INVENTION

In the film separation device 22 of Patent Publication 1, as shown in FIG. 16B, an accurate fitting of the film unit 25 into the top end four corners of the fixing members 23 is necessary for its introduction. In case that the film separation device 22 has a large size, it has been difficult to put the film unit 25 into between the fixing members 23, unless the falling operation of the film unit 25 is conducted by several persons. Furthermore, it is necessary to extend the plurality of fixing members 23, which are fixed on the bottom of the treatment tank 24, to the vicinity of the water surface. This leads to the production cost increase.

Furthermore, in the film separation device 26 of Patent Publication 2, as shown in FIG. 17A, insertion into the guide unit 28 provided on one wall is easy, but a fitting insertion of an axis 30 into the guide unit 28 provided on the other wall has been difficult. Furthermore, every guide unit is independent. Therefore, labor is necessary to install the guide units 28 on the walls.

Furthermore, in a film cassette designed similar to Patent Publication 4, it becomes unnecessary to conduct attaching and detaching operations of a flexible tube connecting the film element and the water collecting pipe, its accessory members, etc. Therefore, its assembly operability and maintenance property are improved as compared with the film cassette designed similar to Patent Publication 3.

However, in case that a plurality of film cassettes are arranged in a water tank to be used for waste water treatment, a water collecting piping to take the treated water out of each film cassette becomes necessary. This water collecting piping is attached to each film cassette before or after the installation of the plurality of film cassettes in the water tank. For example, in the case of stacking the film cassettes of Patent Publication 4 in the water tank, a water collecting piping is connected to the water collecting pipe of each film cassette through another piping.

The film cassette designed similar to Patent Publication 4 is improved in handling characteristic as a single body, but, in the case of constituting a film unit by a plurality of this film cassette, operability when conducting assembly of the film unit or checking or replacement of the film elements is not efficient.

Thus, in one embodiment of the present invention, there is provided a film separation device comprising a treatment tank receiving therein a liquid to be treated; a plurality of film cassettes that are each equipped with filtration films for conducting filtration of the liquid to be treated, the plurality of film cassettes being stacked in a direction along height of the treatment tank; and a guide section that is provided in the treatment tank and guides the film cassettes to a predetermined position, wherein each of at least two film cassettes of the film cassettes has a pair of holding sections that is slidable relative to the guide section, and wherein the guide section has a held section that is fitted between the holding sections.

In one embodiment of the film separation device, the guide section is fixed to a wall surface of the treatment tank and a bottom surface of the treatment tank.

In one embodiment of the film separation device, an upper end section of the held section is exposed out of the liquid to be treated.

In one embodiment of the film separation device, the held section comprises a pair of pipes, a pair of rod-shape members, or a platy member.

In one embodiment of the film separation device, an air diffusion frame is provided beneath the stacked film cassettes.

In one embodiment of the present invention, there is provided a structure for arranging film elements, comprising a plurality of film elements each equipped with a filtration body section for conducting a solid-liquid separation, a water collecting section that collects a treated water, which has been obtained by the solid-liquid separation, from one end section of the filtration body section, and a sealing section that liquid-tightly seals another end section of the filtration body section; a pair of lower retaining sections on which the water collecting sections and the sealing sections of the film elements are placed in a condition that the film elements are aligned; and a treated-water collecting section that collects the treated water from the water collecting sections in a condition that the treated-water collecting section is connected to upper end sections of the water collecting sections.

One embodiment of the arranging structure further comprises a pair of cover sections that is attached to the pair of lower retaining sections in a condition that the pair of cover sections is arranged in parallel with both film elements that are arranged outermost of the film elements.

One embodiment of the arranging structure further comprises an upper retaining section that retains upper end sections of the sealing sections in a condition that the upper retaining section is rotatably fixed to the pair of cover sections.

One embodiment of the arranging structure further comprises an attachment member, to which the treated-water collecting section is attached, in a condition that the attachment member is rotatably or firmly fixed to the pair of cover sections.

One embodiment of the attachment member comprises an attachment body section to which the treated-water collecting section is attached, and a pair of support sections that horizontally supports the attachment body section in a condition that the pair of support sections is rotatably or firmly fixed to opposing surfaces of the pair of cover sections.

One embodiment of the upper retaining section is rotatably fixed to the pair of the cover sections such that retainment of the sealing sections can be cancelled.

In one embodiment of the arranging structure, the water collecting section is formed at an upper end section thereof with a treated-water takeout section that is fitted to the treated-water collecting section.

In one embodiment of the arranging structure, a clip plate section that aligns the treated-water takeout sections is interposed between the water collecting sections and the treated-water collecting section.

In one embodiment of the present invention, there is provided a film cassette equipped with film elements, comprising a plurality of film elements each equipped with a filtration body section for conducting a solid-liquid separation, a water collecting section that collects a treated water, which has been obtained by the solid-liquid separation, from one end section of the filtration body section, and a sealing section that liquid-tightly seals another end section of the filtration body section; a pair of lower retaining sections on which the water collecting sections and the sealing sections of the film elements are placed in a condition that the film elements are aligned; and a treated-water collecting section that collects the treated water from the water collecting sections in a condition that the treated-water collecting section is connected to upper end sections of the water collecting sections.

In one embodiment of the film cassette, the film cassette further comprises a pair of cover sections that is attached to the pair of lower retaining sections and the treated-water collecting section such that the pair of cover sections is parallel with both film elements that are arranged outermost of the film elements, and a holding section to which a tool for lifting the film cassette is connected can be attached to the pair of cover sections.

In one embodiment of the present invention, there is provided a film unit comprising stacked film cassettes, each film cassette being the film cassette.

According to the above invention, it becomes easy to install the film unit in the film separation device. Furthermore, maintenance property is improved when the structure for arranging film elements is formed into a unit.

BRIEF DESCRIPTION OF THE DRAWINGS

FIG. 10A is a plan view of a receiving body section in an upper or lower retaining section of the above embodiment; FIG. 10B is a front view of the receiving body section; FIG. 10C is a side view of the receiving body section; FIG. 10D is a rear view of an attachment section; and FIG. 10E is a vertical section of the attachment section;

FIG. 12A is a plan view of a film cassette of the above embodiment; FIG. 12B is a side view of the film cassette; FIG. 12C is a side view on a header side of the film cassette; FIG. 12D is a side view on a footer side of the film cassette; and FIG. 12E is an explanatory view of an operation example of the upper retaining section in the embodiment;

MODE FOR IMPLEMENTING THE INVENTION

In the following, embodiments of the present invention are explained with reference to the drawings.

First Embodiment

Figure 1:
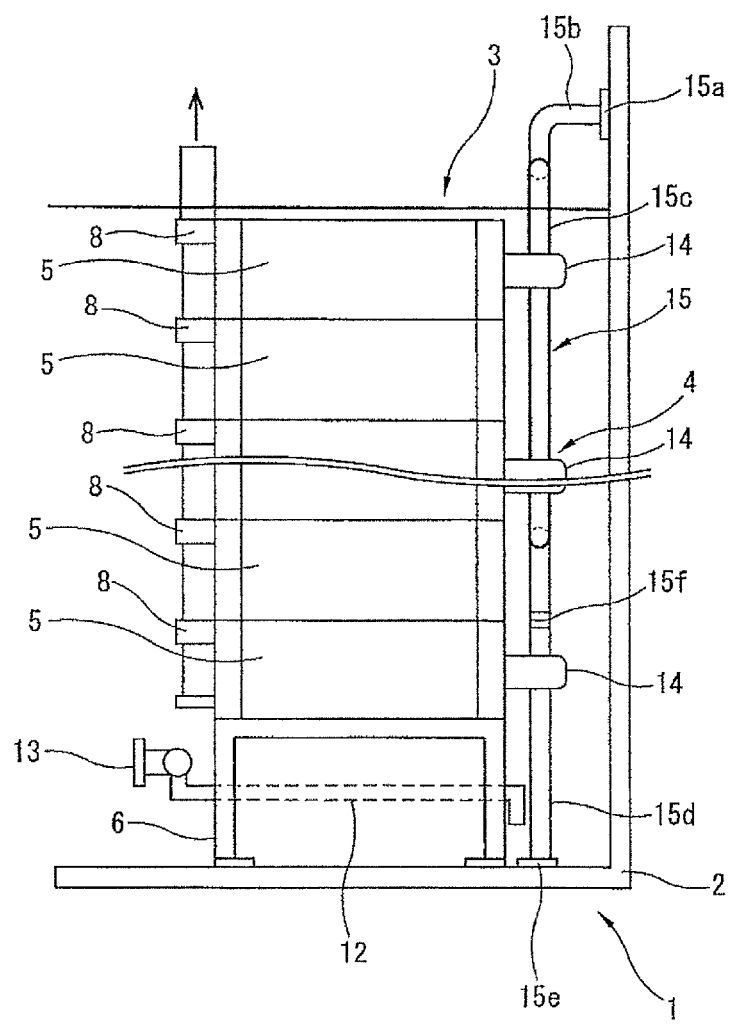
FIG. 1 is a view schematically showing a film separation device according to the first embodiment of the present invention.

As shown in FIG. 1, a film separation device 1 according to the first embodiment of the present invention is equipped with a treatment tank 2 to receive a liquid to be treated, a film unit 3 to be immersed into the liquid to be treated, and a guide mechanism 4 that guides the film unit 3 to a predetermined position. The film unit 3 is composed of a plurality of film cassettes 5 and an air diffusion frame 6.

Figure 2A:
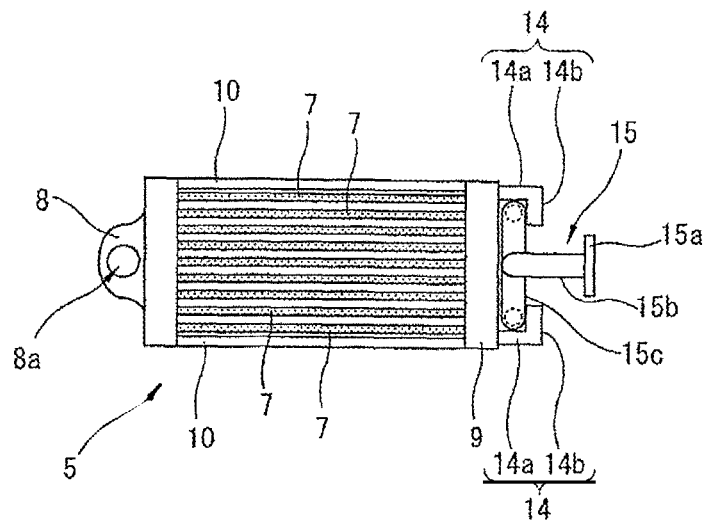
FIG. 2A is a top view of a film cassette having L-shaped holding sections.
Figure 2B:
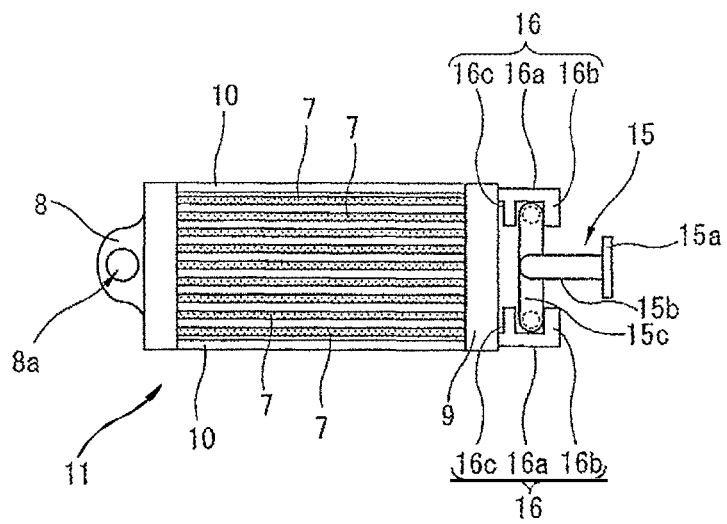
FIG. 2B is a top view of a film cassette having F-shaped holding sections.

As shown in FIG. 2A, the film cassette 5 is equipped with film elements 7, a combined water collecting section 8, a retaining section 9, and side covers 10. The film cassette 5 is opened at its upper and lower sides and has a structure with film elements 7 provided in its inside. A film cassette 11 shown in FIG. 2B is another example of the film cassette 5, and the shape of a holding section 16 that is explained in detail hereinafter is different from that of the film cassette 5. Therefore, in the film cassette 11, the same structures as those of the film cassette 5 are designated by the same signs, and their detailed explanations are omitted.

The film elements 7 are, for example, ceramic flat membranes and are supported between the combined water collecting section 8 and the retaining section 9 in a condition in which they are aligned in a manner to oppose their plate surfaces having ceramic layers formed thereon to each other. The ceramic flat membrane is, for example, one in which a ceramic membrane with a separation function has been formed on an outer surface of a base member formed of a water-permeable ceramic plate. Filtrate that has passed through the ceramic membrane formed on the outer surface passes through a water collecting passage (not shown in the drawings) formed in the inside of the base member and is transferred to the combined water collecting section 8. The film element 7 is not limited to a filter membrane such as ceramic flat membrane. As long as it is a filter membrane having solid-liquid separation function and/or reverse osmosis function as a porous membrane, it is possible to use precision filtration membrane, ultrafiltration membrane, nano-filtration membrane, reverse osmosis membrane, etc. Furthermore, as the film element 7, it is possible to use not only a filtration membrane made of an inorganic material such as ceramic flat membrane, but also a filtration membrane made of an organic material such as polyolefin-series, fluororesin-series, etc.

The combined water collecting section 8 and the retaining section 9 are arranged opposite to each other in a condition in which they support the film elements 7. Side covers 10 are respectively provided at side openings of the combined water collecting section 8 and the retaining section 9, which are arranged opposite to each other.

As shown in FIG. 1, the film cassettes 5 are connected with each other in a manner that their respective combined water collecting sections communicate with each other and are fixed by using a fixing means such as bolts, nuts, etc. not shown in the drawings to form an integrated body. The film cassettes 5 are stacked to form, for example, 1 to 10 levels. Above and under the combined water collecting section 8, there are formed water passage holes 8a that can communicate with other combined water collecting sections 8. By stacking the film cassettes 5, the combined water collecting sections communicate with each other to form a passage of the liquid to be treated. The liquid to be treated, which has been separated by the film elements 7, passes through this passage and is taken to the outside. Furthermore, the air diffusion frame 6 is provided below the stacked film cassettes 5. The air diffusion frame 6 is formed with an air diffusion pipe 12, and air supplied from a blower (not shown in the drawings) connected to a supply port 13 is diffused from the air diffusion pipe 12. An upward flow is generated by air diffused from the air diffusion pipe 12, and this upward flow conducts scrubbing of the film elements 7 in each of the stacked film cassettes 5. With this, pollutants are hardly adhered to the surface of the film element 7.

As the air diffusion pipe 12, it is possible to use, for example, a hollow pipe formed with air diffusion holes, a ceramic one having an air diffusion section, etc. Although it is not shown in the drawings, a jig, etc. for lifting the film unit 3 is attached to the film cassette 5 provided at the top, such that the film unit is movable upward and downward by using a wire, etc.

The guide mechanism 4 is composed of the holding sections 14 provided on the side section of the film cassette 5 and the guide section 15 provided in the treatment tank 2.

As shown in FIG. 2A, the holding section 14 is provided, for example, to project in a horizontal direction from the retaining section 9 of the film cassette 5. The shape of the holding section 14 is not limited to the L-shaped holding section 14 (shown in FIG. 2A), but it may be the F-shaped holding section 16 (shown in FIG. 2B). Furthermore, with respect to the holding sections 14 (and holding sections 16), not only an embodiment to provide them on one side of the film cassette 5, but also an embodiment to provide them on opposite both sides is acceptable. Furthermore, in the case of aligning a plurality of the film units 3 in the treatment tank 2, the guide section 15 is provided at each of the aligned film units 3.

The holding sections 14 have a pair of projection sections 14a extending from the retaining section 9 and extension sections 14b each extending from an end section of one projection section 14a in a direction toward the other projection section 14a. It is provided in a condition in which a held section 15c of the guide section 15 is loosely fitted between the retaining section 9 and the extension sections 14b. Since the holding section 14 is made to have an L-shape, it is possible to easily position the guide section 15 and the holding sections 14 by bringing the retaining section 9 of the film cassette 5 into abutment with the held section 15c of the guide section 15. Therefore, it becomes easy to install the film unit 3. After installing the film unit 3, stability of the film unit 3 is improved by the contact between the retaining section 9 and the held section 15c.

Furthermore, as shown in FIG. 2B, the holding sections 16 have a pair of projection sections 16a extending from the retaining section 9, first extension sections 16b each extending from an end section of the projection section 16a in a direction toward the other projection section 16a, and second extension sections 16c extending from the projection sections 16a to be parallel with the first extension sections 16b. It is provided in a condition in which the held section 15c is loosely fitted between the first extension sections 16b and the second extension sections 16c. Since the holding section 16 is made to have an F-shape, it becomes a condition in which the retaining section 9 and the held section 15c are separated from each other. As a result, when moving the film cassette 5, the surface that is in a sliding contact with the held section 15c becomes small. With this, a risk of breakage of the film cassette 5 caused by the contact with the held section 15c becomes small.

Figure 3:
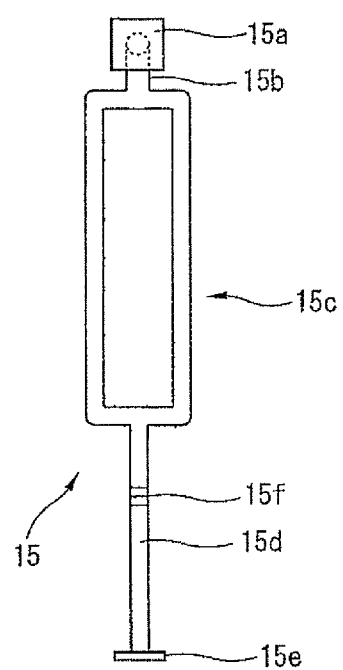
FIG. 3 is a view showing a guide section of the film separation device according to the first embodiment of the present invention.

As shown in FIG. 3, the guide section 15 is equipped with a tank-wall fixed section 15a, an upper extension section 15b, the held section 15c, a lower extension section 15d, and a tank-bottom fixed section 15e. As material of the guide section 15, for example, a stainless steel superior in corrosion resistance is suitable. Material of the guide section 15 is not limited to stainless steel as long as it has a strength that does not interfere with the rise and fall of the film cassette 5. It may be another material having corrosion resistance (material of a guide section 19 of a film separation device 17 according the second embodiment described in detail hereinafter is also similar).

The tank-wall fixed section 15a is fixed to a wall surface of the treatment tank 2 by using a fixing means such as bolts, nuts, etc. Furthermore, the tank-bottom fixed section 15e is fixed to a bottom surface of the treatment tank 2 by using a fixing means such as bolts, nuts, etc.

The upper extension section 15b is provided between the tank-wall fixed section 15a and a top section of the held section 15c. The upper extension section 15b is, for example, a single pipe and has a structure in which it extends upwardly from the top section of the held section 15c and then its top end section is perpendicularly bent toward the wall to be fixed to the wall of the treatment tank 2. The upper extension section 15b may have a mode in which a single pipe is connected from the top section of the held section 15c toward the wall without having a constant length in a direction along its height.

The lower extension section 15d is, for example, a single pipe, is provided between a bottom section of the held section 15c and the tank-bottom fixed section 15e, and supports the held section 15c. The height of the film unit 3 is normally 4 meters or longer. Therefore, the guide section 15 is required to have a height more than that. If the guide section 15 is long, transportation of the guide section 15 becomes difficult. Therefore, there is provided a fitting connection section 15f between the lower extension section 15d and the held section 15c. This connection section 15f is not essential, and the lower extension section 15d and the held section 15c may be formed into one piece.

The held section 15c has a pair of pipes extending in a direction along the height of the treatment tank 2. Since the held section 15c has a pair of pipes, there is provided a constant width at which the held section 15c is fitted between the holding sections 14. In place of a pair of pipes, it is optional to provide a mode in which the held section 15c is formed by using a plate member. As shown in FIGS. 2A and 2B, the held section 15c is fitted (held) between the L-shaped holding sections 14 (or F-shaped holding sections 16).

The guide section 15 may also be formed of a rod-shape member, in place of pipe. Cross-sectional shape (pipe, rod, etc.) of the guide section 15 may be a polygonal shape such as oval, rectangle, etc., in place of circular shape.

Figure 4:
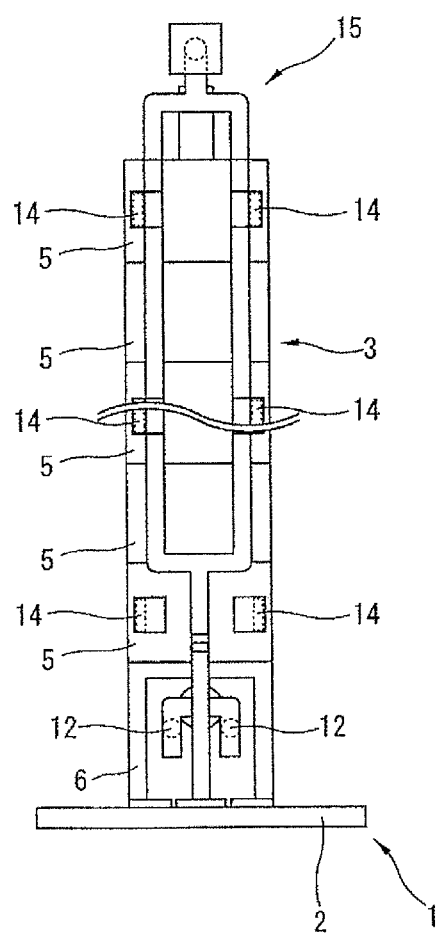
FIG. 4 is a view showing a condition in which the guide section is fitted between the holding sections of the film cassettes.

As shown in FIG. 4, when the film unit 3 is installed in the treatment tank 2, the holding sections 14 are fitted to the held section 15c of the guide section 15, which has been previously fixed in the treatment tank 2. Then, the holding sections 14 slide on the held section 15c, thereby guiding the film unit 3 to a predetermined position of the treatment tank 2.

The guide section 15 is fixed to make a condition in which a part (upper end section) of the held section 15c is shown above the water surface. The holding sections 14 of the film unit 3 are brought to a position above the held section 15c, and then the film unit 3 is vertically lowered to fit the holding sections 14 to the held section 15c. In this manner, the holding sections 14 are inserted into the held section 15c.

The holding sections 14 are fitted to the held section 15c at at least two positions. With this, it is possible to stably rise and fall the film unit 3. Therefore, as long as it is possible to rise and fall the film unit 3 under a fitted condition at at least two positions, some of the film cassettes 5 in the film unit 3 may be free from the holding section 14.

By the above-mentioned film separation device 1 according to the first embodiment of the present invention, it is possible to easily install the film unit 3 in the treatment tank 2 by sequentially fitting the holding sections 14 to the held section 15c.

Furthermore, the guide section 15 is fixed at two positions, one between the wall surface of the treatment tank 2 and the tank-wall fixed section 15a and the other between the bottom surface of the treatment tank 2 and the tank-bottom fixed section 15e. Therefore, the guide section 15 is easily fixed. In particular, the held section 15c of the guide section 15 is supported by the lower extension section 15d as a single member. Therefore, the number of members for fixing the guide section 15 is small, and it becomes easy to install the guide section 15. That is, it becomes easy to attach the guide mechanism 4 that guides the film unit 3 to a predetermined position. Furthermore, the guide section 15 is fixed to the wall surface and the bottom surface of the treatment tank 2. With this, it is possible to suppress displacement of the film unit 3, thereby improving stability of the film unit 3 mounted on the guide section 15.

Furthermore, an upper section of the held section 15c of the guide section 15 is shown above the water surface. With this, it is possible to accurately grasp the position for fitting the holding sections 14. Furthermore, the held section 15c has a constant width. With this, it is possible to suppress displacement of the film unit 3.

Furthermore, of the film cassettes 5 constituting the film unit 3, the film cassette 5 provided at the bottom has the holding sections 14. With this, it is possible to check the rise and fall position of the film unit 3 from a position above the water surface. Since the insertion position can be determined above the water surface, it is possible to easily conduct the insertion operation without receiving the effect of the water flow. In particular, in the case of arranging a plurality of the film units 3 in line, it is possible to prevent the contact of the film units 3 in water by inserting the held section 15c into between the holding sections 14 above the water surface.

Furthermore, it is possible to stably rise and fall the film unit 3 by making a condition in which the holding sections 14 are fitted to the held section 15c at at least two positions. By increasing the number of the positions at which the holding section 14 is fitted to the held section 15c, it is possible to further suppress displacement of the film unit 3.

By providing the holding sections 14 in one direction of the film cassette 5, a single worker can fix the film unit 3 in the treatment tank 2 by fitting the holding sections 14 to the guide section 15. Therefore, operation for installing the film unit 3 becomes easy.

Second Embodiment

A film separation device according to the second embodiment of the present invention is different from the film separation device 1 according to the first embodiment in terms of structure of the guide section. Therefore, structures, such as the film unit 3 and the film cassette 5, similar to those of the film separation device 1 according to the first embodiment are designated by the same signs, and their detailed explanations are omitted.

Figure 5:
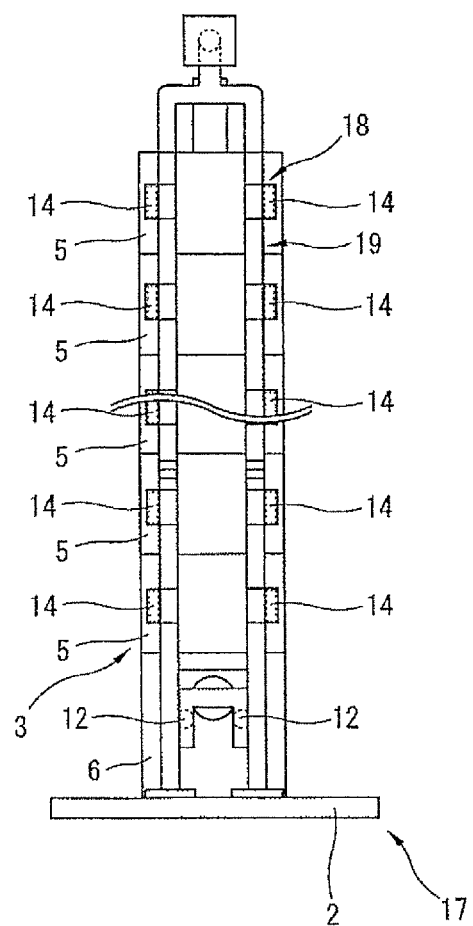
FIG. 5 is a view schematically showing a film separation device according to the second embodiment of the present invention.

As shown in FIG. 5, the film separation device 17 according to the second embodiment of the present invention is equipped with the treatment tank 2 receiving a liquid to be treated, the film unit 3 to be immersed in the liquid to be treated, and a guide mechanism 18. The guide mechanism 18 is composed of the holding sections 14 provided on a side section of the film cassette 5 and a guide section 19 provided in the treatment tank 2.

Figure 6:
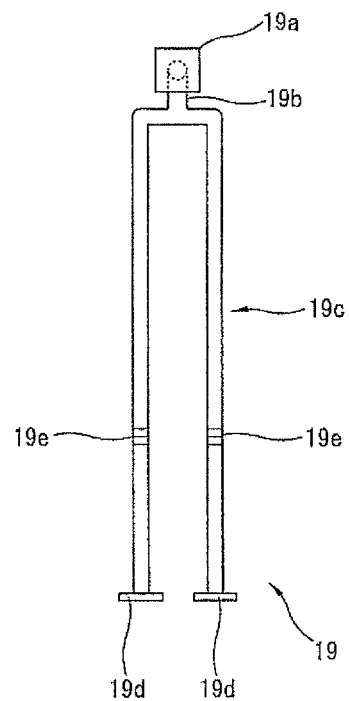
FIG. 6 is a view showing a guide section of the film separation device according to the second embodiment of the present invention.

As shown in FIG. 6, the guide section 19 is equipped with a tank-wall fixed section 19a, an upper extension section 19b, a held section 19c, and a tank-bottom fixed section 19d.

The tank-wall fixed section 19a is fixed to a wall surface of the treatment tank 2 by using a fixing means such as bolts, nuts, etc. Furthermore, the tank-bottom fixed section 19d is fixed to a bottom surface of the treatment tank 2 by using a fixing means such as bolts, nuts, etc.

The upper extension section 19b is similar to the upper extension section 15b of the guide section 15 of the first embodiment and is provided between the tank-wall fixed section 19a and an upper section of the held section 19c.

The held section 19c has a pair of pipes extending upwardly from the tank-bottom fixed section 19d. Since the held section 19c has a pair of pipes, it has a constant width at which the held section 19c is fitted into between the holding sections 14. Each pipe is fixed to the tank-bottom fixed section 19d and is provided to extend upwardly. Similar to the held section 15c shown in FIGS. 2A and 2B, the held section 19c is fitted (held) between the holding sections 14 (or holding sections 16). It is also possible to form a part (or entirety) of the held section 19c by using a plate member, in place of a pair of pipes. The held section is provided with connection sections 19e. When transporting the held section 19c, it can be separated. The connection sections 19e are not essential, and the held section 19c may be formed into one piece.

The guide section 19 may also be formed of a rod-shape member, in place of pipe. Cross-sectional shape (pipe, rod, etc.) of the guide section 19 may be a polygonal shape such as oval, rectangle, etc., in place of circular shape.

As shown in FIG. 5, when the film unit 3 is installed in the treatment tank 2, the holding sections 14 are fitted to the held section 19c of the guide section 19, which has been previously fixed in the treatment tank 2. Then, the holding sections 14 slide on the held section 19c, thereby guiding the film unit 3 to a predetermined position of the treatment tank 2.

The guide section 19 is fixed to make a condition in which a part (upper end section) of the held section 19c is shown above the water surface. The holding sections 14 of the film unit 3 are brought to a position above the held section 19c, and then the film unit 3 is vertically lowered to fit the holding sections 14 to the held section 19c. In this manner, the holding sections 14 are inserted into the held section 19c.

The holding sections 14 are fitted to the held section 19c at at least two positions. With this, it is possible to stably rise and fall the film unit 3. Therefore, as long as it is possible to rise and fall the film unit 3 under a fitted condition at at least two positions, some of the film cassettes 5 in the film unit 3 may be free from the holding section 14.

In the above-mentioned film separation device 17 according to the second embodiment of the present invention, the held section 19c extends to the bottom surface of the treatment tank 2 and is fixed to the tank-bottom fixed section 19d. Therefore, according to this film separation device 17, the holding sections 14 and the held section 19c are always in contact with each other, until the holding sections 14 at the bottom of the film unit 3 are installed. As a result, it is possible to more safely install the film unit 3 in addition to the advantageous effect possessed by the film separation device 17 according to the first embodiment.

Furthermore, in case that the film cassette 5 at the bottom of the film cassettes constituting the film unit 3 is provided with the holding sections 14, the holding sections 14 at the bottom of the film unit 3 do not come out of the held section 19c until completing installation of the film unit 3. Therefore, in case that the film cassette at the bottom of the film unit 3 is provided with the holding sections 14, other film cassettes 5 except the film cassette 5 at the bottom of the film unit 3 may arbitrarily be provided with the holding sections such that the number of the positions to hold the held sections 19c becomes two.

As above, the film separation device of the present invention has been explained by showing specific embodiments. The film separation device of the present invention is, however, not limited to those embodiments. Suitable modifications can be made to the extent that the characteristics are not impaired, and the modified ones also belong to the technical scope of the present invention.

In the explanations of the above embodiments, the film unit 3 constituted by the film cassette 5 having the L-shaped holding sections 14 shown in FIG. 2A is mainly exemplified. It is, however, possible to obtain similar advantageous effects even by the film unit constituted by the film cassette 11 shown in FIG. 2B. That is, the guide mechanisms 4, 18 may have not only an embodiment constituted of the L-shaped holding sections 14 and the guide section 15, 19, but also an embodiment constituted of the F-shaped holding sections 16 and the guide section 15, 19.

Figure 7:
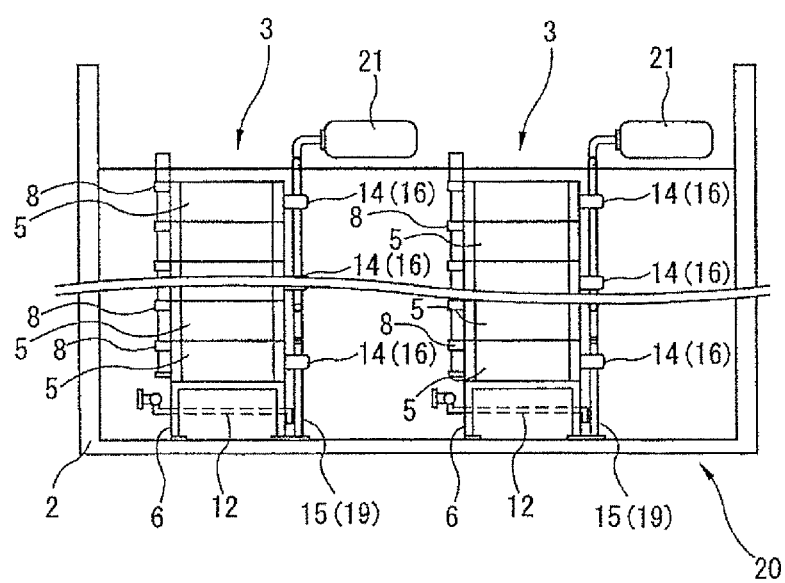
FIG. 7 is a view schematically showing another example of the film separation device of the present invention.

Furthermore, the guide section 15, 19 is not limited to an embodiment to be fixed to the wall surface, etc. of the treatment tank 2. Like a film separation device 20 shown in FIG. 7, it is also possible to have an embodiment in which a foothold 21, beam, etc. is provided as a side wall in the treatment tank 2, and the guide section 15, 19 is fixed thereto.

Furthermore, the present invention's film element arrangement structure may have the following embodiments.

Third Embodiment

Figure 8:
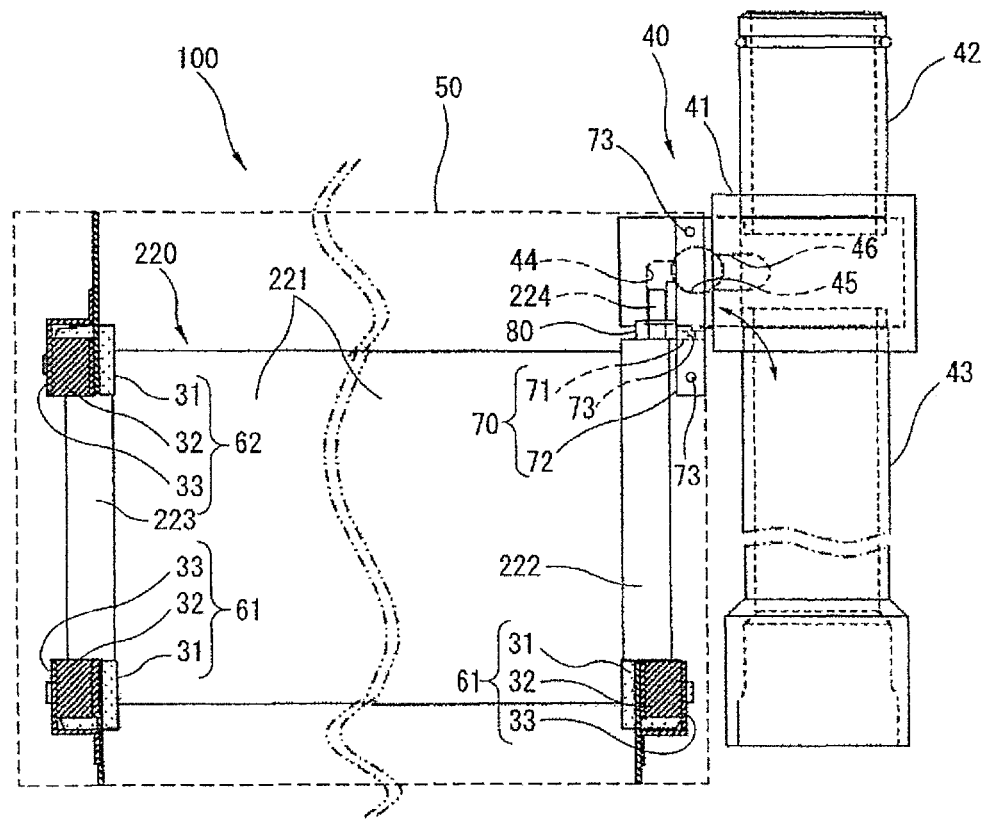
FIG. 8 is a front view of an arrangement structure of a film element in the third embodiment of the present invention.
Figure 9:
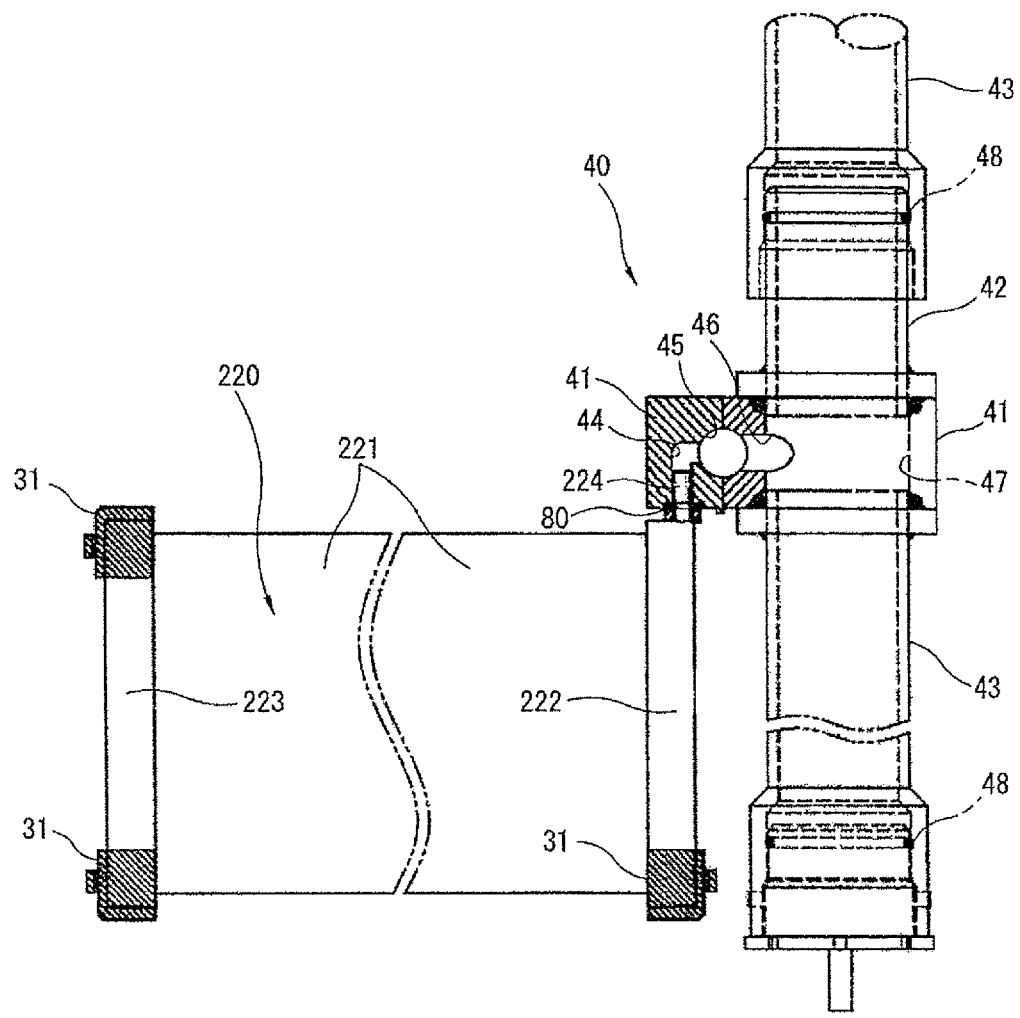
FIG. 9 is a front view of an arrangement structure of the same embodiment, in which a cover section has been removed.

A film cassette 100 shown in FIGS. 8 and 9 is an example of arrangement structure of the film element of the present invention and is equipped with film elements 220 aligned, which are used for solid-liquid separation.

(An Embodiment of Film Cassette 100)

The film cassette 100 has a pair of lower retaining sections 61 on which a plurality of film elements 220 used for solid-liquid separation are aligned, and has a treated-water collecting section 40 for collecting the solid-liquid separated water from headers 222 in a condition that the treated-water collecting section 40 is connected to upper end sections of the headers (water collecting sections) 222 of the film elements 220.

The treated water is taken out of the treated-water collecting section 40 by a suction pump (not shown in the drawings) that sucks this treated water. Without using the suction pump, it is optional to powerlessly filter the liquid to be treated by utilizing pressure head of the liquid to be treated, in the tank having the film cassettes 100 immersed therein.

The film cassette 100 is further equipped with side covers 50 as a pair of cover sections that is attached to the lower retaining sections 61 in a condition that the side covers 50 are aligned with both outermost film elements 220 out of the plurality of film elements 220.

To this pair of side covers 50, there are rotatably fixed an upper retaining section 62 that retains upper end sections of footers (sealing sections) 223 of a plurality of the film elements 220 aligned on the lower retaining sections 61, and an attachment member 70 to which the treated-water collecting section 40 is attached. In particular, the upper retaining section 62 is rotatably fixed to the side covers 50 in a manner to make it possible to cancel retainment of the footers 223. On the other hand, the attachment member 70 is rotatably fixed or can be firmly fixed to the side covers 50.

Furthermore, a clip plate section 80 for aligning treated-water takeout sections 224 of the plurality of headers 222 is interposed between the headers 222 of the plurality of the film elements 220 and the treated-water collecting section 40.

(An Embodiment of Film Element 220)

The film element 220 exemplified in FIGS. 8 and 9 is equipped with a filtration body section 221 that is used for solid-liquid separation, the header 222 that collects the solid-liquid separation treated water from one end section of this filtration body section 221, and the footer 223 that liquid-tightly seals the other end section of the filtration body section 221.

The filtration body section 221 comprises a flat plate filtration member. In the inside of this filtration member, a passage or gap is formed as a space that allows the solid-liquid separation treated water to flow. As a specific embodiment of the filtration member, it is possible to cite one in which a filtration membrane has been formed on a water-permeable, flat plate supporting medium. It suffices to have a filtration function. Therefore, it is not limited to particular embodiments.

As materials for constituting the filtration body section 221, the header 222 and the footer 223, it is possible to cite well-known inorganic materials exemplified by metals, ceramics, etc. applied to solid-liquid separation technology, or well-known organic materials exemplified by polymer resins, etc. It suffices that the constitutional materials have a strength that does not cause breakage by a gas-liquid mixture flow for washing the filtration body section 221 when the filtration body sections 221, the headers 222 and the footers 223 have been incorporated into the film cassette 100. Therefore, they are not particularly limited.

The header 222 and the footer 223 are respectively liquid-tightly fixed to one end section and the other end section of the filtration body section 221 by bonding, welding or molding.

The header 222 is formed at its upper end section with a treated-water takeout section 224 that is fitted to the treated-water collecting section 40. A constitutional material similar to that of the above-mentioned filter body section 221, the header 222, and footer 223 is applied to the treated-water takeout section 224. As the treated-water takeout section 224, it is possible to cite a cylindrical mode, but it is optional to apply a polygonal mode exemplified by triangle or rectangle other than circle in terms of transverse section.

As another mode of the film element 220, it is optional to use an embodiment having a frame that is provided at peripheral section of the filtration body section 221 and is made of the above-mentioned inorganic material or the above-mentioned organic material, and a treated-water takeout section 224 that constitutes one piece with one edge surface of this frame.

(An Embodiment of Lower Retaining Section 61 and Upper Retaining Section 62)

As shown in FIG. 8, the lower retaining section 61 and the upper retaining section 62 are formed of the same constitutional elements and are in an upside-down relation relative to each other when the side covers 50 have been attached.

The lower retaining section 61 or the upper retaining section 62 is formed of a receiving body section 31 that supports the headers 222 or footers 223 of the film elements 220 in an aligned condition, a supporting section 32 that horizontally supports this receiving body section 31, and an attachment section 33 to which this supporting section 32, the side covers 50 and an end cover 90 are attached.

As shown in FIG. 10A, the receiving body section 31 is formed with a plurality of grooves 34 at even intervals that vertically support the headers 222 or footers 223 to align a plurality of the film elements 220. Furthermore, as shown in FIGS. 10A to 10C, engaging sections 35 that engage with engaging holes 37 of the receiving body section 31 are projectingly formed on an attachment surface of the receiving body section 31 facing the attachment section 33.

The length of the grooves 34 is secured such that the headers 222 and the footers 223 can be placed in the grooves 34, even if the length of individual film element 220 has an individual difference. For example, the length of the groove 34 is set to be longer than outer diameter of the footer 223 along the transverse direction of the filtration body section 221. The width of the groove 34 for placing therein the footer 223 is set to be somewhat wider than the width of the footer 223.

The attachment section 33 is formed of a member having a U-shaped transverse section. Its front body section is formed with attachment holes 36 of fasteners (not shown in the drawings) such as bolts and nuts for fastening this front body section and an end cover 90 together, and engaging holes 37 with which the engaging sections 35 of the receiving body section 31 are engaged.

On the other hand, both side body sections of the attachment section 33 are formed with attachment holes 38 of the fasteners for fastening these side body sections and side covers 50. As shown in FIG. 10E, the upper attachment hole 38 is formed into an L-shaped long hole, and the lower attachment hole 38 is formed into a long hole along the vertical direction. Due to such embodiment, in a condition that the upper retaining section 62 is attached to both side covers 50, retaining the footers 223 and its cancelation become possible.

An example of material for constituting the receiving body section 31 is ethylene propylene diene rubber, but it is not limited to this material.

Depending on the use environment of the film cassette 100, an elastic member having well-known strength and chemical resistance is suitably selected and applied.

The supporting section 32 and the attachment section 33 are formed by bending of a steel plate made of a steel material such as stainless steel (e.g., SUS304). It is also possible to fix this supporting section 32 to the attachment section 33 by a fastener, bonding or welding, depending on the material of the supporting section 32 and the attachment section 33.

(An Embodiment of Treated Water Collecting Section 40)

The treated water collecting section 40 is formed of a water collecting body section 41, an upper end pipe section 42, and a lower end pipe section 43.

As shown in FIG. 8, the water collecting body section 41 introduces the treated water from the treated-water takeout sections 224 of the film elements 220 in a condition that the treated-water takeout sections 224 of the plurality of headers 222, which are aligned by the clip plate section 80, are fitted into the water collecting body section 41.

The water collecting body section 41 exemplified in FIGS. 8 and 11 is formed with connecting holes 44 into which the treated-water takeout sections 224 are fitted, a water collecting path 45 that communicate with these connecting holes 44, a communicating water path 46 that communicates with this water collecting path 45, and a water passage 47 that communicates with this communicating water path 46.

Figure 11A:
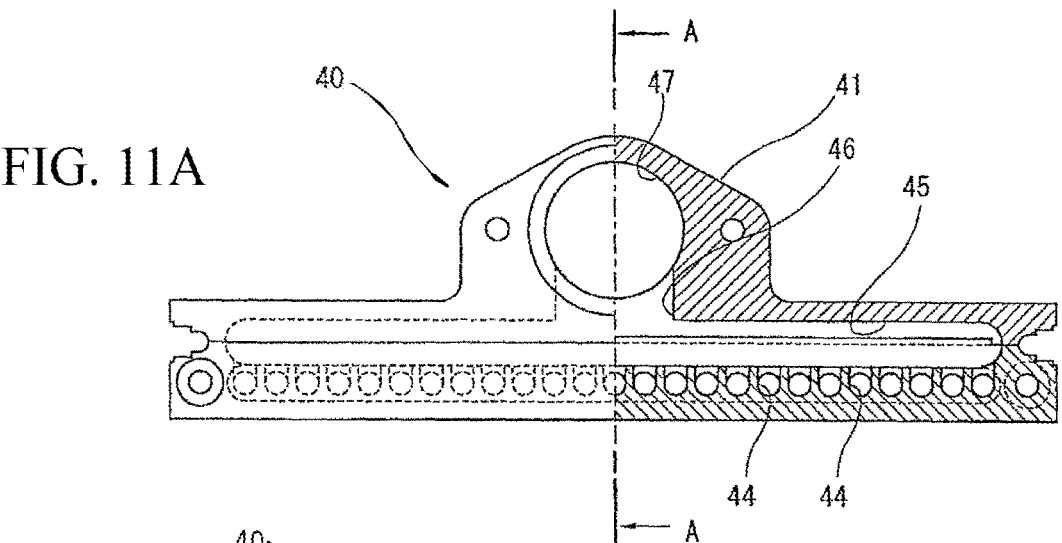
FIG. 11A is a plan view, partially laterally cross sectioned, of a treated-water collecting section of the above embodiment.
Figure 11B:
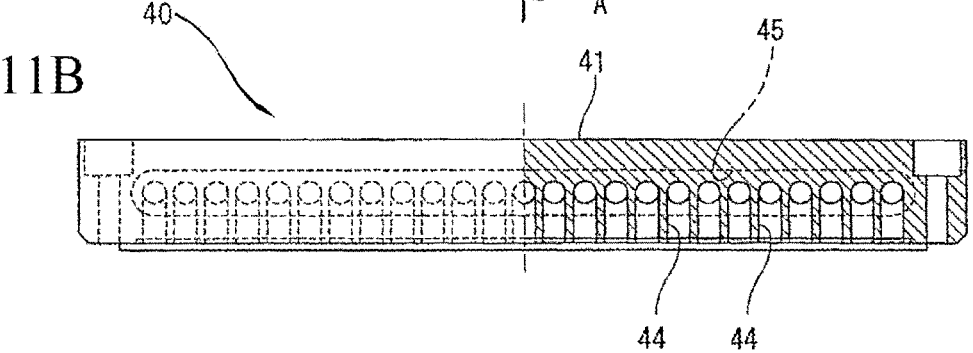
FIG. 11B is a front view, partially vertically cross sectioned, of the treated-water collecting section.
Figure 11C:
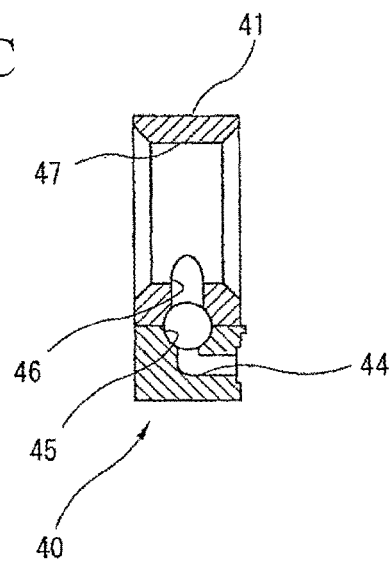
FIG. 11C is a cross sectional view taken along A-A of the treated-water collecting section.

As shown in FIGS. 11A to 11C, the connecting holes 44 are arranged at even intervals in the longitudinal direction of the water collecting body section 41, and their inner diameter is set to a diameter corresponding to the outer diameter of the treated-water takeout section 224. The water collecting path 45 is formed to extend in the longitudinal direction of the water collecting body section 41.

The upper end pipe section 42 is formed of a pipe that is vertically connected to an upper end section of the water collecting body section 41 to communicate with the water passage 47 such that the treated water is discharged from the water collecting body section 41.

The lower end pipe section 43 is formed of a pipe that is vertically connected to a lower end section of the water collecting body section 41 to communicate with the water passage 47 such that the treated water supplied from the upper end pipe section 42 of another film cassette 100 disposed immediately under the film cassette 100 of the present embodiment is supplied to the water collecting body section 41.

The material for constituting the water collecting body section 41, the upper end pipe section 42 and the lower end pipe section 43 is exemplified by polyvinylchloride resin. It is, however, not limited to this material. Depending on the use environment of the film cassette 100, a steel material or resinous member having well-known strength and chemical resistance is suitably selected and applied.

The water collecting body section 41, the upper end pipe section 42, and the lower end pipe section 43 are connected together by a well-known method, such as welding, adhesive, and bolt fixing, based on their material.

In case that the film cassettes 100 are stacked, the upper end pipe section 42 of one film cassette 100 is formed such that an upper peripheral section of this upper end pipe section 42 is fitted to an inner peripheral surface in the vicinity of the lower end of the lower end pipe section 43 of another film cassette 100 disposed immediately above this film cassette 100. This upper end pipe section 42 is liquid-tightly connected with the lower end pipe section 43 of the another film cassette 100 through a water stop member 48 made of a rubber elastic body.

Furthermore, the water collecting body section 41 is liquid-tightly connected to the treated-water takeout sections 224 with an interposal of O-rings made of rubber elastic bodies as water stop members between the clip plate section 80 and the water collecting body section 41.

(An Embodiment of Side Cover 50)

The side cover 50 is formed of an elongated plate member. As the material for constituting the side cover 50, it is possible to cite a steel member such as stainless steel (e.g., SUS304). Depending on the use environment, a steel material or resinous member having well-known strength, water resistance, chemical resistance, weather resistance and corrosion resistance is suitably selected or combined and applied.

Figure 13A:
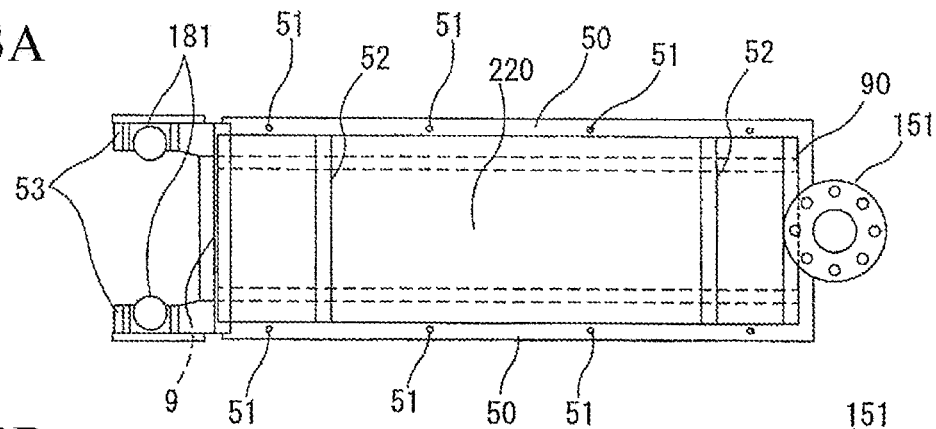
FIG. 13A is a plan view of a film cassette of the same embodiment, equipped with holding sections.
Figure 13B:
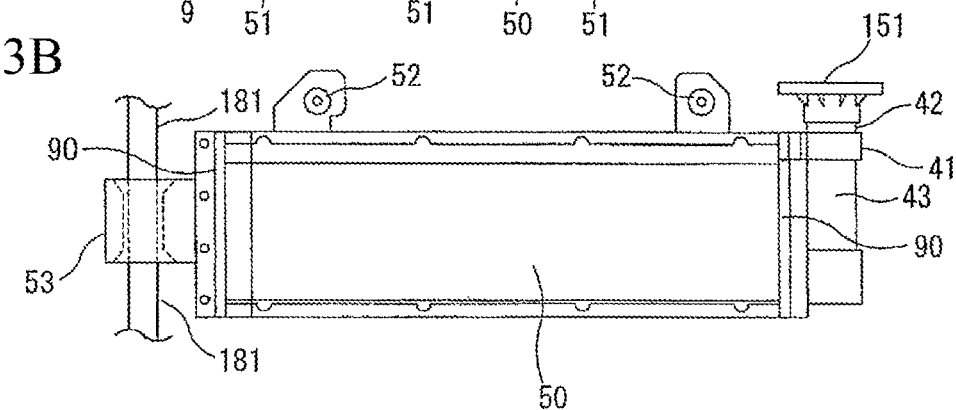
FIG. 13B is a side view of the film cassette.

As shown in FIGS. 12A-12E, the side cover 50 is formed with attachment holes 51 of fasteners for fastening the lower retaining sections 61, and the upper retaining section 62 and the attachment member 70 to the side cover 50. Furthermore, as shown in FIGS. 13A and 13B, depending on the use condition of the film cassette 100, holding sections 52 to which a lifting tool is connected are suitably attached to the side covers 50.

(An Embodiment of Attachment Member 70)

As shown in FIG. 8, the attachment member 70 is formed of an attachment body section 71, to which the treated-water collecting section 40 is attached, and a pair of support sections 72 that horizontally supports the attachment body section 71 in a condition that the pair of support sections 72 is rotatably fixed or firmly fixed to opposing surfaces of the pair of the side covers 50.

Each of the attachment body section 71 and the support sections 72 is formed of, for example, an elongated platy stainless steel, and they are formed into a single body by bending or welding to constitute the attachment member 70.

The attachment body section 71 is formed with an attachment hole 73 of a fastener for fastening this attachment body section 71 and a lower surface of the treated-water collecting section 40.

Furthermore, attachment holes 73 of fasteners for fastening the support section 72 and the side cover 50 are formed also in the vicinity of the upper end and in the vicinity of the lower end of the support section 72.

(An Embodiment of Clip Plate Section 80)

Figure 14A:
FIG. 14A is a longitudinal direction side view of a clip plate in the above embodiment.
Figure 14B:
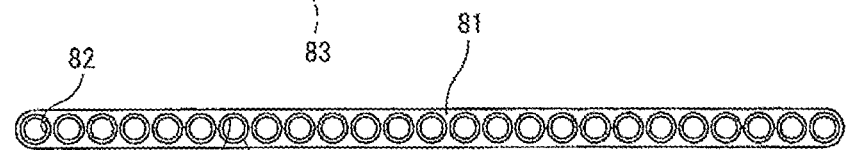
FIG. 14B is a plan view of the clip plate.
Figure 14C:
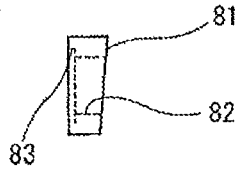
FIG. 14C is a short direction side view of the clip plate.

As shown in FIGS. 14A to 14C, the clip plate section is formed of a flat platy member. Its clip plate body section 81 is formed with a plurality of through holes 82 of the treated-water takeout sections 224 of the film elements 220, which are arranged at even intervals along the longitudinal direction of the clip plate body section 81 in accordance with the number of film elements 220 arranged.

A recess section 83 for disposing therein a water stop member (not shown in the drawings) to achieve water stopping between the treated-water takeout section 224 and the treated-water collecting section 40 is formed at an outer periphery of an outlet of the through hole 82 opposed to the treated-water collecting section 40. In the present embodiment, it is possible to stably interpose the water stop member between the treated-water takeout section 224 and the treated-water collecting section 40.

As the material of the clip plate section 80, it is possible to cite a well-known organic material exemplified by polymer resins such as polyvinyl chloride resin, etc. It is, however, optional to apply a well-known inorganic material exemplified by metals, ceramics, etc.

The water stop member is exemplified by O-ring, but an embodiment corresponding to the pipe shape of the treated-water takeout section 224 is adopted. As the material for constituting the water stop member, a water-stopping, well-known elastic member is suitably selected and applied, depending on the use environment of the film cassette 100. It is suitably selected, for example, from ethylene propylene diene rubber, ethylene propylene rubber, polytetrafluoroethylene, fluorine-based rubbers, silicone-based rubbers, etc.

The inner diameter of the through hole 82 is set to be relatively larger than the outer diameter of the treated-water takeout section 224. In particular, it is more better to set the same to a diameter such that the movements of the treated-water takeout sections 224 in the horizontal direction can be limited when all the treated-water takeout sections 224 have been fitted to the treated-water collecting section 40, by maintaining the distance between the treated-water takeout sections 224 in the clip plate body section 81 to be a constant error or less.

In case that an upper end surface of the headers 222 for disposing thereon the clip plate section 80 is not horizontal, as shown in FIG. 14C, if an end surface of the clip plate section 80 that is to be opposed to the upper end surface is formed into a tapered shape corresponding to the inclined condition of the upper end section, it is possible to correct a connection surface between the clip plate section 80 and the treated-water collecting section 40 to make it horizontal.

(An Embodiment of Assembly Procedure of Film Cassette 100)

With reference to FIGS. 8 and 9, the assembly procedure of the film cassette 100 is explained.

Firstly, the side covers 50 are fixed by fasteners to the attachment sections 33 of the lower retaining sections 61, which are disposed at positions corresponding to the headers 222 and the footers 223 of the film elements 220. Then, the upper retaining section 62 and the attachment member 70 are attached to the both side covers 50 in a condition that they project outwardly from the side covers 50. Then, the headers 222 and the footers 223 of the film elements 220 are placed into all the grooves 34 of the lower retaining sections 61 corresponding to the headers 222 and the footers 223. Then, the upper retaining section 62 and the attachment member 70 are rotated to dispose them at fixing positions on the opposed surfaces of both side covers 50, and then they are fixed to the opposed surfaces by fasteners. Furthermore, both end covers 90 are fixed by fasteners to the lower retaining section 61, the upper retaining section 62 and the attachment member 70.

Then, the clip plate section 80 is mounted on the treated-water takeout sections 224 of the film elements 220, which are aligned. Furthermore, water stop members are disposed at recess sections 83 of this clip plate section 80. Then, if the water collecting body section 41 of the treated-water collecting section 40 is connected to these treated-water takeout section 224, the water collecting body section 41 is placed on the attachment body section 71 of the attachment member 70. To this water collecting body section 41, the upper end pipe section 42 and the lower end pipe section 43 are previously connected.

Then, if this water collecting body section 41 is fixed to the attachment body section 71 by fasteners, assembly of the film cassette 100 is completed.

If the end covers 90 are previously fixed to the lower retaining section 61 and the attachment member 70 on the side of the headers 222 and to the lower retaining section 61 and the upper retaining section 62 on the side of the footers 223, the efficiency of assembly work of the film cassette 100 is improved.

(Advantageous Effect of the Third Embodiment)

In the above film cassette 100, the headers 222 and the footers 223 of the plurality of film elements are placed in an aligned manner on the lower retaining sections 61. Furthermore, the upper end sections of the headers 222 of these film elements 220 as a set are connected to the treated-water collecting section 40. Therefore, once the treated-water collecting section 40 is removed from the upper end sections of the headers 222 of the plurality of the film elements 220, replacement of an arbitrary film element(s) 220 becomes easy, thereby improving maintainability of the film cassette 100 as a unit.

In particular, the upper retaining section 62 and the attachment member 70, which retain the footers 223 and the headers 222 of the film elements 220, are rotatably fixed to the side covers 50. Therefore, it becomes easy to conduct an operation of fixing the film elements 220 and cancellation. This improves operability of assembly of the film cassette 100. In the above explanation, there is provided an embodiment in which the upper retaining section 62 and the attachment member 70 are rotatably fixed to the side covers 50. It is, however, optional to adopt an embodiment in which only the upper retaining section 62 is rotatably fixed to the side covers 50, in case that installation and/or replacement of the film elements 220 can easily be conducted by removing the treated-water collecting section 40.

Furthermore, the treated-water collecting section 40 is fixedly placed on the attachment body section 71 of the attachment member 70. Therefore, it is possible to stably support the treated-water collecting section 40 at the side covers 50.

Furthermore, the upper end sections of the headers 222 are equipped with the treated-water takeout sections 224, which are fitted to the treated-water collecting section 40. With this, it becomes easy to position the connection of the treated-water collecting section 40 relative to the headers 222, thereby improving the connection operability.

The clip plate section 80 for aligning the treated-water takeout sections 224 is interposed between the headers 222 and the treated-water collecting section 40. With this, positioning when aligning the film elements 220 becomes easy. Furthermore, it is possible to rapidly conduct putting the treated-water takeout sections 224 into the treated-water collecting section 40 and taking them out of the same. Therefore, the connection operability of the treated-water takeout section 224 is improved. Furthermore, liquid-tightness between the headers 222 and the treated-water collecting section 40 is improved by using both of the clip plate section 80 and the water stop members.

Fourth Embodiment

Figures 15A, 15B:
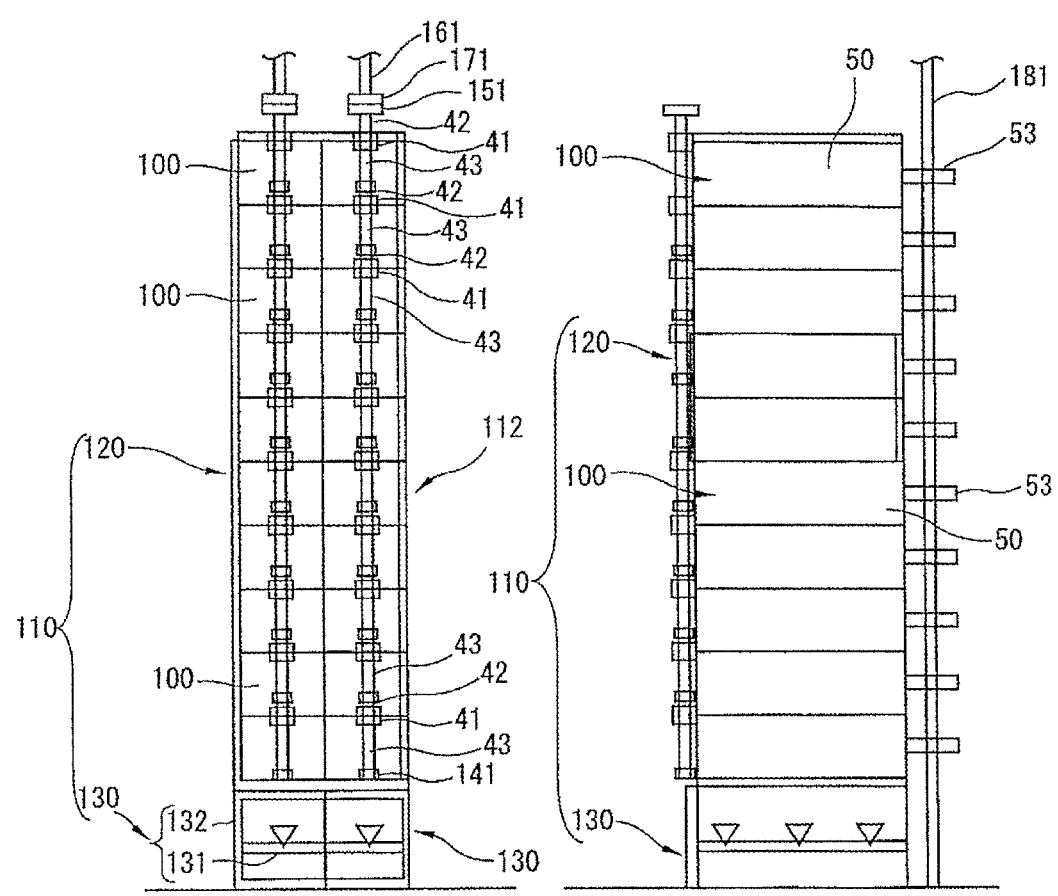
FIG. 15A is a side view of a film unit in the fourth embodiment of the present invention.
FIG. 15B is a front view of the film unit.
Figure 16A:
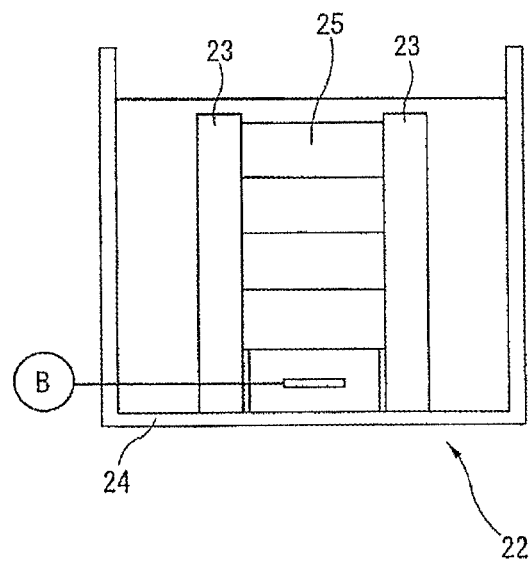
FIG. 16A is a vertically cross sectional view of a prior art film separation device.
Figure 16B:
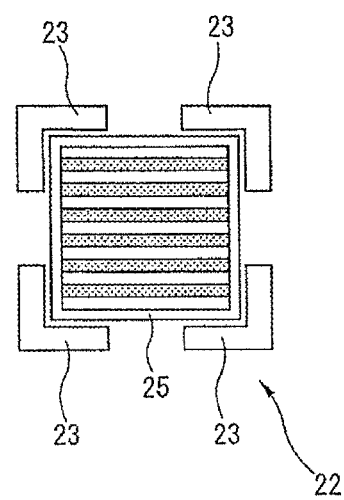
FIG. 16B is a horizontally cross sectional view of the prior art film separation device.
Figure 17A:
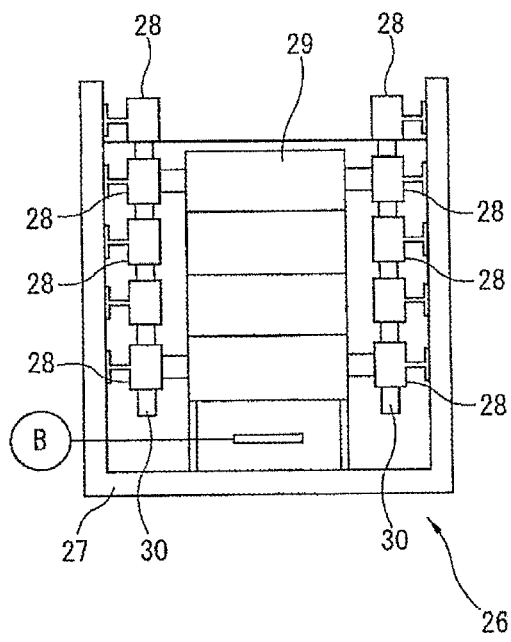
FIG. 17A is a vertically cross sectional view of a prior art film separation device.
Figure 17B:
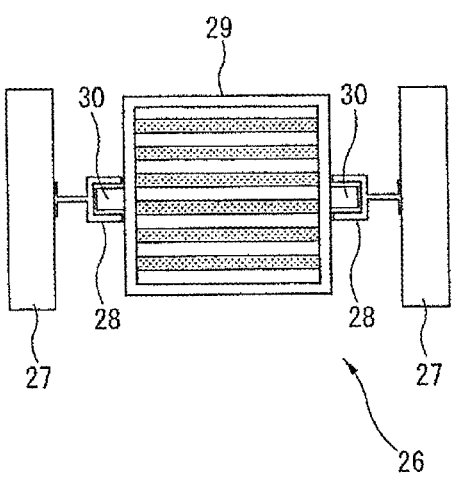
FIG. 17B is a horizontally cross sectional view of the prior art film separation device.

As another embodiment of the present invention, it is possible to cite, for example, a film unit 110 shown in FIGS. 15A and 15B.

The film unit 110 is a film unit immersed in a liquid to be treated, used for a solid-liquid separation treatment, and comprises a cassette stacked section 120 formed by stacking film cassettes 100, and an air diffusion section 130 that supplies air to the film cassettes 100 of this cassette stacked section 120.

In the film unit 110 shown in the drawings, two cassette stacked sections 120 are aligned. The number of the cassette stacked sections 120 aligned and the number of the stacked film cassettes 100 are not limited to those of the embodiment exemplified in the drawings, but are suitably set depending on the treatment amount of the liquid to be treated.

(An Embodiment of Cassette Stacked Section 120)

The cassette stacked section 120 is formed by stacking a plurality of film cassettes 100 in the height direction. An upper end pipe section 42 of one film cassette 100 is liquid-tightly connected with a lower end pipe section 43 of another film cassette, which is disposed immediately thereabove, through a water stop member 48.

A lower end opening section of a lower end pipe section 43 of a film cassette 100 disposed at the bottom is liquid-tightly sealed in advance by a sealing lid 141. On the other hand, an upper end opening section of an upper end pipe section 42 of a film cassette 100 at the top is equipped with a flange section 151. To this flange section 151, there is liquid-tightly connected a flange section 171 of a transfer pipe 161 for transferring a solid-liquid separation treated water, which has been supplied from the upper end pipe section 42, to the outside of the system.

In the cassette stacked section 120, upper peripheral sections and lower peripheral sections of the side covers 50 of the film cassettes 100, which are adjacent to each other in the height direction, are previously horizontally bent. As shown in FIGS. 13A and 13B, these upper peripheral sections and lower peripheral sections are formed with attachment holes 51 of fasteners for connecting the side covers 50 of the upper film cassette 100 and the side covers 50 of the lower film cassette 100. By connecting the lower peripheral sections of the upper film cassette 100 and the upper peripheral sections of the lower film cassette 100 by the fasteners, the film cassettes 100 are stacked in the height direction.

Furthermore, holding sections 52 as shown in FIGS. 13A and 13B are attached to the side covers 50 of the film cassette 100 at the top in the film cassettes 100, and a lifting tool not shown in the drawings is connected to these holding sections 52. With this, it becomes possible to take out and in the cassette stacked section 120 relative to the treatment tank in which the film unit 110 is installed.

(An Embodiment of Air Diffusion Section 130)

The air diffusion section 130 is equipped with an air diffusion pipe 131 and an air diffusion frame 132.

The air diffusion pipe 131 diffuses air supplied from a blower that is outside the system. To the air diffusion pipe 131, it suffices to suitably apply a well-known air diffusion device adopted in the waste water treatment technology.

The cassette stacked section 120 is installed in a standing and detachable manner on an upper end section of the air diffusion frame 132, which is formed of a frame body receiving the air diffusion pipe 131 directly below the cassette stacked section 120. This frame body is disposed on the bottom section of the water tank in which the film unit is installed.

Furthermore, the frame body of the air diffusion frame 132 is formed on its upper end section with positioning pins (not shown in the drawings) projecting for positioning the cassette stacked section 120. These positioning pins are inserted into the fasteners' attachment holes 51 at the lower peripheral sections of the side covers 50 of the film cassette 100 disposed at the bottom of the cassette stacked section 120, thereby making it possible to position the cassette stacked section 120 on the air diffusion frame 132.

Depending on the use environment of the film unit 110, similar to the side covers 50, a steel material or resinous member having well-known strength and chemical resistance is suitably selected and applied to the constituent material of the air diffusion frame 132.

Furthermore, in a one-to-one correspondence between the air diffusion sections 130 and the cassette stacked sections 120, it is possible to take out and in a unit of the cassette stacked section 120 and the air diffusion frame 132 relative to the water tank, if previously joining the cassette stacked section 120 and the air diffusion frame 132.

Furthermore, as shown in FIG. 15B, when taking out and in the cassette stacked section 120 relative to the water tank, a pair of guide pipes 181 is installed in a standing manner in the water tank to guide rise and fall of the cassette stacked section 120. On the other hand, as shown in FIGS. 13A and 13B, both side covers 50 of each film cassette 100 of the cassette stacked section 120 are equipped with a pair of guide receivers 53 to which the guide pipes 181 are loosely fitted.

(An Example of Assembly Procedure of Film Unit 110)

With reference to FIGS. 15A and 15B, an example of assembly procedure of the film unit 110 is explained.

Firstly, two film cassettes 100 are preliminarily arranged above and below in a condition that stop pins not shown in the drawings are inserted into the attachment holes 51 at the lower peripheral sections and the upper peripheral sections of the side covers 50 of the film cassettes 100. Then, the film cassettes 100 are stacked by attaching fasteners to the attachment holes 51 after removing the stop pins therefrom. As exemplarily shown in the same drawing, repeating such procedure completes the cassette stacked section 120 with 10 stages of the film cassettes 100 stacked.

A lifting tool is connected to the holding sections 52 of the film cassette 100 at the top to lift the cassette stacked section 120 and then take it into the water tank. Then, this cassette stacked section 120 is fixed to the air diffusion frame 132 in a condition that the film cassette 100 at the bottom is positioned by the positioning pins of the air diffusion frame 132. Then, the flange section 171 of the transfer pipe 161 is liquid-tightly connected to the flange section 151 of the film cassette 100 at the top.

As mentioned above, as shown in the same drawing, the cassette stacked sections 120 arranged in two lines are fixed to the air diffusion sections 130 in the water tank to complete the film unit 110.

In the case of replacing the film element(s) 220 in the maintenance of the film unit 110, firstly, the flange section 171 of the transfer pipe 161 is removed from the flange section 151 of the cassette stacked section 120. Then, the holding sections 52 are attached to both side covers 50 of the film cassette 100 at the top of the cassette stacked section 120. Furthermore, in a condition that the lifting tool is connected to the holding sections 52, the fixation of the cassette stacked section 120 on the air diffusion frame 132 is canceled. Then, the cassette stacked section 120 is lifted by the lifting tool to take it out of the water tank. In this cassette stacked section 120 taken out, the film cassette 100 at the top is firstly taken out, and then the others are similarly taken out in order to separate all of the film cassettes 100.

Then, the treated-water collecting section 40 is removed from the attachment body section 71. Furthermore, upper fasteners at the attachment member 70 and the upper retaining section 62 of the film cassette 100 are removed, and then the attachment member 70 and the upper retaining section 62 are rotated toward the outside of the side covers 50. With this, replacement of the film element(s) 220 becomes possible. Furthermore, when operating the film unit 110, in case that the water tank is free from the water to be treated, it becomes possible to conduct a maintenance operation of the film unit 110 in the water tank.

In the above explanation, there is provided an embodiment in which the upper retaining section 62 and the attachment member 70 are rotatably fixed to the side covers 50, but the attachment mode of the upper retaining section 62 and the attachment member 70 to the side covers 50 of the present invention is not limited to this embodiment. For example, in case that the film element(s) 220 can be installed and replaced by rotating the upper retaining section 62 to the outside of the side covers 50 and then removing the treated-water collecting section 40, it is optional to adopt an embodiment in which only the upper retaining section 62 is rotatably fixed to the side covers 50.

(Advantageous Effect of the Present Embodiment)

According to the above-mentioned film unit 110, during the process of stacking the film cassettes 100, it is possible to make a direct connection between the lower end pipe section 43 of one film cassette 100 and the upper end pipe section 42 of another film cassette 100 that is immediately below the one film cassette 100.

Therefore, in the case of constituting the film unit 110 by a plurality of the film cassettes 100, no flexible tube becomes necessary, and a mutual connection of the film cassettes 100 becomes simple. This remarkably improves operability when conducting assembly of the film unit 110 and inspection and replacement of the film element(s).

INDUSTRIAL USABILITY

The fields to which the present invention's film separation device, structure for arranging film element, and film cassette and film unit can be applied are water and waste water fields and various industrial waste waters, etc., and they are installed in a water tank to deal with these waters to be treated.

EXPLANATION OF SIGNS 1, 17, 20 - - - a film separation device
2 - - - a treatment tank
3 - - - a film unit
4, 18 - - - a guide mechanism
5, 11 - - - a film cassette
6 - - - an air diffusion frame
7 - - - a film element (filtration membrane)
8 - - - a combined water collecting section
9 - - - a retaining section
10 - - - a side cover
12 - - - an air diffusion pipe
13 - - - a supply port
14, 16 - - - a holding section
14a, 16a - - - a projection section, 14b - - - an extension section
16b - - - a first extension section, 16c - - - a second extension section
15, 19 - - - a guide section
15a - - - a tank-wall fixed section, 15b - - - an upper extension section, 15c - - - a held section, 15d - - - a lower extension section, 15e - - - a tank-bottom fixed section, 15f - - - a connection section
19a - - - a tank-wall fixed section, 19b - - - an upper extension section, 19c - - - a held section, 19d - - - a tank-bottom fixed section, 19e - - - a connection section
21 - - - a foothold
100 - - - a film cassette
220 - - - a film element, 221 - - - a filtration body section, 222 - - - a header (water collecting section), 223 - - - a footer (sealing section), 224 - - - a treated-water takeout section
40 - - - a treated-water collecting section, 41 - - - a water collecting body section,
42 - - - an upper end pipe section, 43 - - - a lower end pipe section
50 - - - a side cover (cover section), 52 - - - a holding section, 53 - - - a guide receiver
61 - - - a lower retaining section
62 - - - an upper retaining section
70 - - - an attachment member, 71 - - - an attachment body section, 72 - - - a support section
80 - - - a clip plate section
110 - - - a film unit 120 - - - a cassette stacked section
130 - - - an air diffusion section, 131 - - - an air diffusion pipe, 132 - - - an air diffusion frame
181 - - - a guide pipe

The invention claimed is:

1. A structure for arranging film elements, comprising:
a plurality of film elements each equipped with a filtration body section for conducting a solid-liquid separation, a water collecting section that collects a treated water, which has been obtained by the solid-liquid separation, from one end section of the filtration body section, and a sealing section that liquid-tightly seals another end section of the filtration body section;
a pair of lower retaining sections on which the water collecting sections and the sealing sections of the film elements are placed in a condition that the film elements are aligned; and
a treated-water collecting section that collects the treated water from the water collecting sections in a condition that the treated-water collecting section is connected to upper end sections of the water collecting sections,
wherein the water collecting section is formed at an upper end section thereof with a treated-water takeout section that is fitted to the treated-water collecting section,
wherein a clip plate section that aligns the treated-water takeout sections is interposed between the water collecting sections and the treated-water collecting section,
wherein the treated water collecting section comprises a water collecting body section, an upper end pipe section, and a lower end pipe section,
wherein the water collecting body section is formed with:
connecting holes which are arranged at even intervals in a longitudinal direction of the water collecting body section and into which the treated-water takeout sections are fitted,
a water collecting path that communicate with the connecting holes,
a communicating water path that communicates with the water collecting path, and
a water passage that communicates with the communicating water path,
wherein the upper end pipe section and the lower end pipe section are respectively vertically connected an upper end section and a lower end section of the water collecting body section to communicate with the water passage.

2. The structure for arranging film elements as claimed in claim 1, further comprising a pair of cover sections that is attached to the pair of lower retaining sections in a condition that the pair of cover sections is arranged in parallel with both film elements that are arranged outermost of the film elements.

3. The structure for arranging film elements as claimed in claim 2, further comprising an upper retaining section that retains upper end sections of the sealing sections in a condition that the upper retaining section is rotatably fixed to the pair of cover sections.

4. The structure for arranging film elements as claimed in claim 3, further comprising an attachment member, to which the treated-water collecting section is attached, in a condition that the attachment member is rotatably or firmly fixed to the pair of cover sections.

5. The structure for arranging film elements as claimed in claim 4, wherein the attachment member comprises an attachment body section to which the treated-water collecting section is attached, and a pair of support sections that horizontally supports the attachment body section in a condition that the pair of support sections is rotatably or firmly fixed to opposing surfaces of the pair of cover sections.

6. The structure for arranging film elements as claimed in claim 3, wherein the upper retaining section is rotatably fixed to the pair of the cover sections such that retainment of the sealing sections can be cancelled.

7. A film cassette equipped with film elements, comprising:
a plurality of film elements each equipped with a filtration body section for conducting a solid-liquid separation, a water collecting section that collects a treated water, which has been obtained by the solid-liquid separation, from one end section of the filtration body section, and a sealing section that liquid-tightly seals another end section of the filtration body section;
a pair of lower retaining sections on which the water collecting sections and the sealing sections of the film elements are placed in a condition that the film elements are aligned; and
a treated-water collecting section that collects the treated water from the water collecting sections in a condition that the treated-water collecting section is connected to upper end sections of the water collecting sections,
wherein the water collecting section is formed at an upper end section thereof with a treated-water takeout section that is fitted to the treated-water collecting section,
wherein a clip plate section that aligns the treated-water takeout sections is interposed between the water collecting sections and the treated-water collecting section,
wherein the treated water collecting section comprises a water collecting body section, an upper end pipe section, and a lower end pipe section,
wherein the water collecting body section is formed with:
connecting holes which are arranged at even intervals in a longitudinal direction of the water collecting body section and into which the treated-water takeout sections are fitted,
a water collecting path that communicate with the connecting holes,
a communicating water path that communicates with the water collecting path, and
a water passage that communicates with the communicating water path,
wherein the upper end pipe section and the lower end pipe section are respectively vertically connected an upper end section and a lower end section of the water collecting body section to communicate with the water passage.

8. The film cassette as claimed in claim 7, wherein the film cassette further comprises a pair of cover sections that is attached to the pair of lower retaining sections and the treated-water collecting section such that the pair of cover sections is parallel with both film elements that are arranged outermost of the film elements, and
wherein a holding section to which a tool for lifting the film cassette is connected can be attached to the pair of cover sections.

9. A film unit comprising stacked film cassettes, each film cassette being the film cassette as claimed in claim 8.

* * * * *